(12) United States Patent
Sobel

(10) Patent No.: US 7,469,419 B2
(45) Date of Patent: Dec. 23, 2008

(54) DETECTION OF MALICIOUS COMPUTER CODE

(75) Inventor: William Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 923 days.

(21) Appl. No.: 10/266,340

(22) Filed: Oct. 7, 2002

(65) Prior Publication Data

US 2004/0068663 A1 Apr. 8, 2004

(51) Int. Cl.
*G06F 21/00* (2006.01)

(52) U.S. Cl. .................................................. 726/24
(58) Field of Classification Search .................. 726/24; 714/38

See application file for complete search history.

(56) References Cited

U.S. PATENT DOCUMENTS

| | | | |
|---|---|---|---|
| 5,398,196 A | 3/1995 | Chambers |
| 5,440,723 A | 8/1995 | Arnold et al. |
| 5,452,442 A | 9/1995 | Kephart |
| 5,473,769 A | 12/1995 | Cozza |
| 5,572,590 A | 11/1996 | Chess |
| 5,675,710 A | 10/1997 | Lewis |
| 5,696,822 A | 12/1997 | Nachenberg |
| 5,715,174 A | 2/1998 | Cotichini et al. |
| 5,715,464 A | 2/1998 | Crump et al. |
| 5,758,359 A | 5/1998 | Saxon |
| 5,812,763 A | 9/1998 | Teng |
| 5,826,013 A | 10/1998 | Nachenberg |
| 5,826,249 A | 10/1998 | Skeirik |
| 5,832,208 A | 11/1998 | Chen et al. |
| 5,854,916 A | 12/1998 | Nachenberg |
| 5,889,943 A | 3/1999 | Ji et al. |
| 5,949,973 A | 9/1999 | Yarom |
| 5,951,698 A | 9/1999 | Chen et al. |
| 5,956,481 A | 9/1999 | Walsh et al. |
| 5,960,170 A | 9/1999 | Chen et al. |
| 5,974,549 A | 10/1999 | Golan |
| 5,978,917 A | 11/1999 | Chi |

(Continued)

FOREIGN PATENT DOCUMENTS

DE 100 21 686 A1 11/2001

(Continued)

OTHER PUBLICATIONS

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

(Continued)

*Primary Examiner*—Gilberto Barron, Jr.
*Assistant Examiner*—Hadi Armouche
(74) *Attorney, Agent, or Firm*—Fenwick & West LLP

(57) ABSTRACT

Systems, methods, and computer readable media for determining whether a computer file (210) has been infected with malicious code by an attacking agent. A scanning engine (205) determines whether the file (210) contains malicious code. The scanning engine (205) includes detection modules (325) for detecting particular attacking agents, and indicators of when particular attacking agents were first created. The scanning engine (205) determines a critical date for a file (210) with regards to a particular attacking agent. If the file (210) has not been changed since the critical date, the scanning engine (205) determines that the file (210) has not been infected by that attacking agent.

20 Claims, 5 Drawing Sheets

U.S. PATENT DOCUMENTS

| | | | |
|---|---|---|---|
| 5,987,610 | A | 11/1999 | Franczek et al. |
| 6,021,510 | A | 2/2000 | Nachenberg |
| 6,023,723 | A | 2/2000 | McCormick et al. |
| 6,052,709 | A | 4/2000 | Paul et al. |
| 6,070,244 | A | 5/2000 | Orchier et al. |
| 6,072,830 | A | 6/2000 | Proctor et al. |
| 6,072,942 | A | 6/2000 | Stockwell et al. |
| 6,088,803 | A | 7/2000 | Tso et al. |
| 6,092,194 | A | 7/2000 | Touboul |
| 6,094,731 | A | 7/2000 | Waldin et al. |
| 6,104,872 | A | 8/2000 | Kubota et al. |
| 6,108,799 | A | 8/2000 | Boulay et al. |
| 6,130,924 | A | 10/2000 | Rosenzweig et al. |
| 6,161,130 | A | 12/2000 | Horvitz et al. |
| 6,167,434 | A | 12/2000 | Pang |
| 6,192,379 | B1 | 2/2001 | Bekenn |
| 6,199,181 | B1 | 3/2001 | Rechef et al. |
| 6,253,169 | B1 | 6/2001 | Apte et al. |
| 6,275,938 | B1 | 8/2001 | Bond et al. |
| 6,298,351 | B1 | 10/2001 | Castelli et al. |
| 6,338,141 | B1 | 1/2002 | Wells |
| 6,347,310 | B1 | 2/2002 | Passera |
| 6,357,008 | B1 | 3/2002 | Nachenberg |
| 6,370,526 | B1 | 4/2002 | Agrawal et al. |
| 6,370,648 | B1 | 4/2002 | Diep |
| 6,397,200 | B1 | 5/2002 | Lynch et al. |
| 6,397,215 | B1 | 5/2002 | Kreulen et al. |
| 6,421,709 | B1 | 7/2002 | McCormick et al. |
| 6,424,960 | B1 | 7/2002 | Lee et al. |
| 6,442,606 | B1 | 8/2002 | Subbaroyan et al. |
| 6,456,991 | B1 | 9/2002 | Srinivasa et al. |
| 6,493,007 | B1 | 12/2002 | Pang |
| 6,502,082 | B1 | 12/2002 | Toyama et al. |
| 6,505,167 | B1 | 1/2003 | Horvitz et al. |
| 6,535,891 | B1 | 3/2003 | Fisher et al. |
| 6,552,814 | B2 | 4/2003 | Okimoto et al. |
| 6,611,925 | B1 | 8/2003 | Spear |
| 6,622,150 | B1 | 9/2003 | Kouznetsov et al. |
| 6,662,198 | B2 * | 12/2003 | Satyanarayanan et al. ... 707/204 |
| 6,678,734 | B1 | 1/2004 | Haatainen et al. |
| 6,697,950 | B1 | 2/2004 | Ko |
| 6,721,721 | B1 | 4/2004 | Bates et al. |
| 6,735,700 | B1 * | 5/2004 | Flint et al. ............ 726/24 |
| 6,748,534 | B1 | 6/2004 | Gryaznov et al. |
| 6,763,462 | B1 | 7/2004 | Marsh |
| 6,813,712 | B1 | 11/2004 | Luke |
| 6,851,057 | B1 | 2/2005 | Nachenberg |
| 6,898,715 | B1 | 5/2005 | Smithson et al. |
| 6,910,134 | B1 | 6/2005 | Maher et al. |
| 7,010,696 | B1 | 3/2006 | Cambridge et al. |
| 7,093,239 | B1 | 8/2006 | van der Made |
| 7,093,293 | B1 | 8/2006 | Smithson et al. |
| 7,096,215 | B2 | 8/2006 | Bates et al. |
| 7,099,916 | B1 | 8/2006 | Hericourt et al. |
| 2001/0020272 | A1 | 9/2001 | Le Pennec et al. |
| 2002/0004908 | A1 | 1/2002 | Galea |
| 2002/0035693 | A1 | 3/2002 | Eyres et al. |
| 2002/0035696 | A1 | 3/2002 | Thacker |
| 2002/0038308 | A1 | 3/2002 | Cappi |
| 2002/0046275 | A1 | 4/2002 | Crosbie et al. |
| 2002/0073046 | A1 | 6/2002 | David |
| 2002/0083175 | A1 | 6/2002 | Afek et al. |
| 2002/0083343 | A1 | 6/2002 | Crosbie et al. |
| 2002/0087649 | A1 | 7/2002 | Horvitz |
| 2002/0087740 | A1 | 7/2002 | Castanho et al. |
| 2002/0091940 | A1 | 7/2002 | Wellborn et al. |
| 2002/0138525 | A1 | 9/2002 | Karadimitriou et al. |
| 2002/0147694 | A1 | 10/2002 | Dempsey et al. |
| 2002/0147782 | A1 | 10/2002 | Dimitrova et al. |
| 2002/0157008 | A1 | 10/2002 | Radatti |
| 2002/0162015 | A1 | 10/2002 | Tang |
| 2002/0178374 | A1 | 11/2002 | Swimmer et al. |
| 2002/0178375 | A1 | 11/2002 | Whittaker et al. |
| 2002/0194488 | A1 | 12/2002 | Cormack et al. |
| 2002/0199186 | A1 | 12/2002 | Ali et al. |
| 2002/0199194 | A1 | 12/2002 | Ali |
| 2003/0018903 | A1 | 1/2003 | Greca et al. |
| 2003/0023865 | A1 | 1/2003 | Cowie et al. |
| 2003/0033587 | A1 | 2/2003 | Ferguson et al. |
| 2003/0051026 | A1 | 3/2003 | Carter et al. |
| 2003/0065926 | A1 | 4/2003 | Schultz et al. |
| 2003/0101381 | A1 * | 5/2003 | Mateev et al. ............ 714/38 |
| 2003/0105973 | A1 * | 6/2003 | Liang et al. ............ 713/200 |
| 2003/0115458 | A1 | 6/2003 | Song |
| 2003/0115479 | A1 | 6/2003 | Edwards et al. |
| 2003/0115485 | A1 | 6/2003 | Milliken |
| 2003/0120951 | A1 | 6/2003 | Gartside et al. |
| 2003/0126449 | A1 | 7/2003 | Kelly et al. |
| 2003/0140049 | A1 | 7/2003 | Radatii |
| 2003/0191966 | A1 | 10/2003 | Gleichauf |
| 2003/0212902 | A1 | 11/2003 | van der Made |
| 2003/0236995 | A1 | 12/2003 | Fretwell, Jr. |
| 2004/0015712 | A1 | 1/2004 | Szor |
| 2004/0015726 | A1 | 1/2004 | Szor |
| 2004/0030913 | A1 | 2/2004 | Liang et al. |
| 2004/0039921 | A1 | 2/2004 | Chuang |
| 2004/0158730 | A1 | 8/2004 | Sarkar |
| 2004/0162808 | A1 | 8/2004 | Margolus et al. |
| 2004/0181687 | A1 | 9/2004 | Nachenberg et al. |
| 2005/0021740 | A1 | 1/2005 | Bar et al. |
| 2005/0044406 | A1 | 2/2005 | Stute |
| 2005/0132205 | A1 | 6/2005 | Palliyil et al. |
| 2005/0177736 | A1 | 8/2005 | De los Santos et al. |
| 2005/0204150 | A1 | 9/2005 | Peikari |
| 2006/0064755 | A1 | 3/2006 | Azadet et al. |
| 2006/0161979 | A1 | 7/2006 | Pandey et al. |

FOREIGN PATENT DOCUMENTS

| | | |
|---|---|---|
| EP | 0636977 A2 | 2/1995 |
| EP | 1 280 039 A | 1/2003 |
| EP | 1408393 A2 | 4/2004 |
| GB | 2 364 142 A | 1/2002 |
| WO | WO 93/25024 A1 | 12/1993 |
| WO | WO 97/39399 A | 10/1997 |
| WO | WO 99/15966 A1 | 4/1999 |
| WO | WO 00/28420 A2 | 5/2000 |
| WO | WO 01/37095 A1 | 5/2001 |
| WO | WO 01/91403 A | 11/2001 |
| WO | WO 02/05072 A | 1/2002 |
| WO | WO 02/33525 A2 | 4/2002 |

OTHER PUBLICATIONS

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythnum Computerviren: Dichtug Und Wahrheit Uber Den Schrecken Des Informatkzeitlers," *Technische Kundschau*, Hallwag, Bern CH vol. 84, No. 36. Sep. 4, 1992, pp. 44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http://www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

Aho, A.V. et al., Compilers, Addison-Wesley Publishing Company, USA, revised edition 1988.

Bolosky, W. et al., "Single Instance Storage in Windows 2000," Microsoft Research, Balder Technology Group, Inc., [online] [retrieved Oct. 11, 2002] Retrieved from the Internet<UIRL:http://research.microsoft.com/sn/farsite/wss2000.pdf>.

Bontchev, V., "Possible Macro Virus Attacks and How to Prevent Them," Computer & Security, vol. 15, No. 7, pp. 595-626, 1996.

Burchell, J., "NetShield 1.5," Virus Bulletin, Aug. 1994, pp. 21-23, XP 000617453.

Chew, M. et al., "Mitigating Buffer Overflows by Operating System Randomization," Dec. 2000, pp. 1-9, U.C. Berkeley, CA, USA.

Choi, Y-S. et al., "A New Stack Buffer Overflow Hacking Defense Technique with Memory Address Confirmation," Lecture Notes in Computer Science 2288, 2002, pp. 146-159, Springer Verlag, Berlin and Heidelsberg, Germany.

"Cyclic Redundancy Check," Wikipedia, [online] Retrieved on Oct. 31, 2005, Retrieved from the Internet<URL:http://en.wikipedia.org/wiki/Cyclic_redundancy_check>.

"Enterprise Protection Strategy," [online] Trend Micro Inc. [retrieved Dec. 3, 20002] Retrieved from the Internet: <URLhttp://www.trendmicro.com/en/products/eps/features.htm>.

"How to Test Outbreak Commander," Trend Micro Inc., Aug. 2002, pp. 1-13, Cupertino, CA.

International Search Report, PCT/US02/10867, Sep. 1, 2003, 5 pages.

Morar, J.E. et al., "Can Cryptography Prevent Computer Viruses?" Virus Bulletin Conference 2000, Sep. 2000, pp. 127-138, Virus Bulletin Ltd., Oxfordshire, England.

Outlook.spambully.com web pages [online] Spam Bully [retrieved Jan. 16, 2003] Copyright 2002, Retrieved from the Internet<URL:http://outlookspambully.com/about.php>.

Periot, F., "Defeating Polymorphism Through Code Optimization," Paper given at the Virus Bulletin conference, Sep. 26-27 Oct. 2003, pp. 142-159, Toronto, Canada, published by Virus Bulletin Ltd., The Pentagon, Abingdon, Oxfordshire, England.

Randexec web pages [online]. Virtualave.net [retrieved May 1, 2003]. Retrieved from the Internet<URL:http://pageexec.virtualave.net/docs/randeec.txt>.

Randkstack web pages [online]. Virtualave.net [retrieved May 1, 2003]. Retrieved from the Internet<URL:http://pageexec.virtualave.net/docs/randkstack.txt>.

Randmmap web pages [online]. Virtualave.net [retrieved 5/1/203]. Retrieved from the Internet<URL:http://pageexec.virtualave.net/docs/randmmap.txt>.

Randustack web pages [online]. Virtualave.net [retrieved May 1, 2003]. Retrieved from the Internet<URL:http://pageexec.virtualave.net/docs/randustack.txt>.

Symantec Corporation, "Norton AntiVirus Corporate Edition," 1999, Version 1.0, pp. 5-44.

VMA Mirroring web pages [online]. Virualave.net [retrieved 5/1/203]. Retrieved from the Internet<URL:http://pageexec.virtualave.net/docs/vmmirror.txt>.

Wikipedia.org web pages [online], Wikipedia, [retrieved Mar. 17, 2003] Retrieved from the Internet<URL:http://www.wikipedia.org/w/wiki/phintl?title-machine learning and pintable=yes>.

* cited by examiner

DETECTION OF MALICIOUS COMPUTER CODE

TECHNICAL FIELD

This invention relates generally to improving the performance of malicious computer code detection methods, and more particularly to preemptively determining which computer files are free of malicious code.

BACKGROUND ART

During the brief history of computers, system administrators and users have been plagued by attacking agents such as viruses, worms, and Trojan Horses, which may be designed to disable host computer systems and propagate themselves to connected systems.

In recent years, two developments have increased the threat posed by these attacking agents. Firstly, increased dependence on computers to perform mission critical business tasks has increased the economic cost associated with system downtime. Secondly, increased interconnectivity among computers has made it possible for attacking agents to spread to a large number of systems in a matter of hours.

Attacking agents can infect a system by replacing the executable code stored in existing files. When the system attempts to execute the code stored in these files, it instead executes malicious code inserted by the attacking agent, allowing the attacking agent to gain control of the system. Virus scanning utilities, such as Norton Antivirus, produced by Symantec Corporation of Cupertino, Calif., allow a user to determine whether a file containing executable code has been infected with malicious code.

Traditionally, these utilities have been able to detect viruses by checking for suspicious sections of code in designated locations or looking for other easily detectable characteristics. These methods can be performed quickly, with little burden to system resources.

However, as attacking agents have become more sophisticated, scanning utilities have needed to perform even more complicated tests to detect the presence of malicious code. For example, special purpose code may have to examine large portions of a file or perform complicated emulation techniques to detect the presence of viruses.

These techniques must often be performed serially, and are extremely time and resource intensive. Optimizing these routines sufficiently to prevent them from becoming prohibitively time consuming when applied to a large number of files is becoming extremely difficult as attacking agents grow in number and complexity. What is needed is a way to improve the speed and reliability of detection techniques.

DISCLOSURE OF INVENTION

The present invention comprises methods, systems, and computer readable media for determining whether a computer file (210) has been infected with malicious code by an attacking agent. A scanning engine (205) determines whether executable files (210) contain malicious code. The scanning engine (205) includes detection modules (325) for detecting particular attacking agents and indicators of when particular attacking agents were first created. The scanning engine (205) determines when the file (210) was last changed by referring to a change log (225) or an inoculation database (215). The scanning engine (205) determines a critical date, the critical date indicating a date when the file is believed to have been free of infection by the attacking agent. The critical date may be a date when the file (210) was last scanned for the presence of an attacking agent or the creation date of the attacking agent. If the scanning engine (205) determines that the date when the file (210) was last changed is earlier than the critical date, the scanning engine (205) determines that the file (210) has not been infected by the attacking agent.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The present invention provides for determining whether a computer file 210 contains malicious code by determining whether the file 210 has been changed since a critical date when the file is believed to have been free of infection by the attacking agent, such as a creation date for an attacking agent or a date on which the file 210 was scanned for infection by the attacking agent.

As used herein, the term "malicious code" refers to any program, module, or piece of code that is loaded onto a system without the user's knowledge and/or against the user's wishes. The term "attacking agent" refers to a program which inserts malicious code into a file 210 and includes Trojan Horse programs, worms, viruses, and other such insidious software. An attacking agent may include the ability to replicate itself and compromise other computer systems. As used herein, the terms "infected" and "infect" refer to the process of inserting malicious code in a file.

Figure 1:
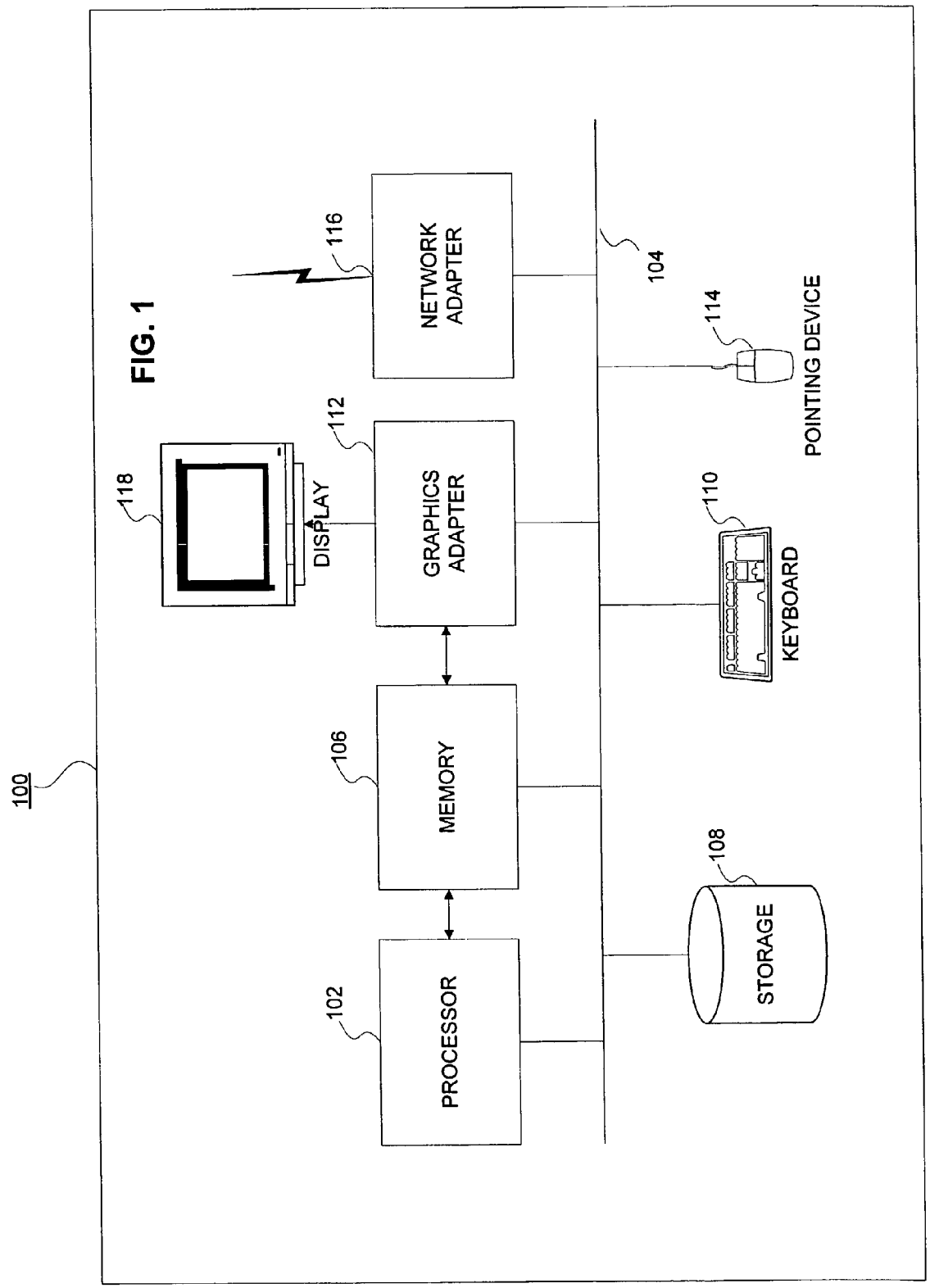
FIG. 1 is a high level block diagram illustrating a computer system 100.

FIG. 1 is a high level diagram illustrating a computer system 100. Illustrated are a processor 102 coupled to a bus 104. There may be more than one processor 102. Also coupled to the bus 104 are a memory 106, a storage device 108, a keyboard 110, a graphics adapter 112, a pointing device 114, and a network adapter 116. A display 118 is coupled to the graphics adapter 112.

The storage device 108 may be any device capable of holding large amounts of data, such as a hard drive, compact disk read-only memory (CD-ROM), DVD, or some other form of fixed or removable storage device.

The memory 106 holds instructions and data used by the processor 102. The pointing device 114 may be a mouse, touch-sensitive display, or other type of pointing device and is used in combination with the keyboard 110 to input data into the computer system 100. The types of hardware and software within the computer system 100 may vary.

Figure 2:
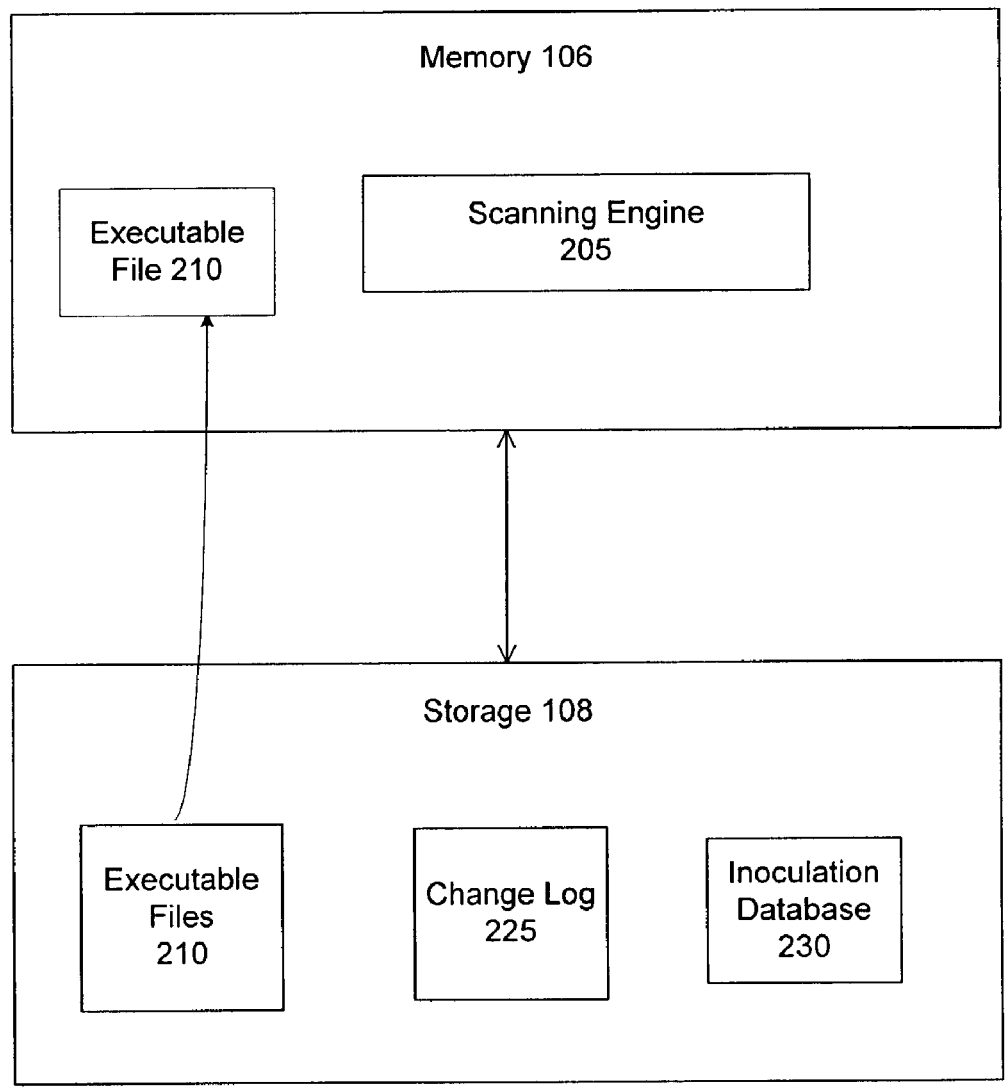
FIG. 2 is a block diagram illustrating a closer view of the memory 106 and the storage 108 of the computer system 100 of FIG. 1.

FIG. 2 is a block diagram illustrating a closer view of the memory 106 and the storage 108 of the computer system 100 of FIG. 1. The memory 106 includes a scanning engine 205 that detects the presence of malicious code in the computer system 100. The scanning engine 205 identifies data to be checked for the presence of attacking agents, checks for the attacking agents, and, if necessary, responds to a detected attacking agent. Typically, the data to be checked reside in either the storage device 108, the memory 106, or both. The scanning engine 205, therefore, identifies particular files 210 and/or memory locations to be checked for attacking agents. Other data that may be identified by the scanning engine 205 include emails received or sent by the computer system 100, streaming data received from the Internet, etc.

The scanning engine 205 comprises a group of modules that are stored on the storage 108 and loaded into memory 106. As used herein, the term "module" refers to computer program logic and/or any hardware or circuitry utilized to provide the functionality attributed to the module. A module may be implemented in hardware, software, firmware, or any combination of the three.

The storage 108 includes executable files 210, which are files containing executable code to be executed by the computer system 100. As most attacking agents must find a way to cause the system to execute code introduced by the attacking agent, attacking agents often insert malicious code into the executable files 210. Thus, these files 210 are of particular concern in detecting attacking agents. Typically, an executable file 210 is loaded either partially or entirely into memory 106 so that it can be examined by the scanning engine 205.

The storage 108 also includes a change log 225. The change log 225 is maintained by a file system on the computer system 100, and indicates changes that are made to those files 210 controlled by the file system. The file system monitors interaction between applications stored in memory 205 and files 210 in storage 108, and records the changes in the change log 225. Typically, these changes include the times that the file 210 was changed and characteristics of the file 210 before and after the change. The change log 225 may be a circular log of a fixed size, in which the oldest stored changes are replaced with newer changes. Alternatively, the change log 225 may not have a fixed size limit, and can include all changes made to files 210 since the creation of the change log 225.

The scanning engine 205 also maintains an inoculation database 230. The inoculation database 230 stores a plurality of entries, each associated with an executable file 210, relating to the status of the executable file 210. The inoculation database 230 stores an indicator of when the file 210 was last scanned and which detection modules 325 were applied to it. In one embodiment, the scanning engine 205 maintains a log of when the file 210 was last changed. The scanning engine 205 may actively monitor interaction with the file 210 to detect any changes. Alternatively, the scanning engine 205 may store hashes of the executable files 210 in the inoculation database 235 and compare them to newly generated hashes to determine whether the files 210 have changed.

As used herein, a "hash" or "hash function" is a one-way function, from a variable sized input to a fixed size output, that is substantially collision free. Normally, the output is smaller than the input. "One-way" means that it is easy to compute the output from the input, but computationally infeasible to compute the input from the output. "Substantially collision free" means that it is very difficult to find two or more inputs that hash to the same output. Examples of suitable hash functions usable in the present invention are MD5 and a CRC (Cyclic Redundancy Check) function.

Figure 3:
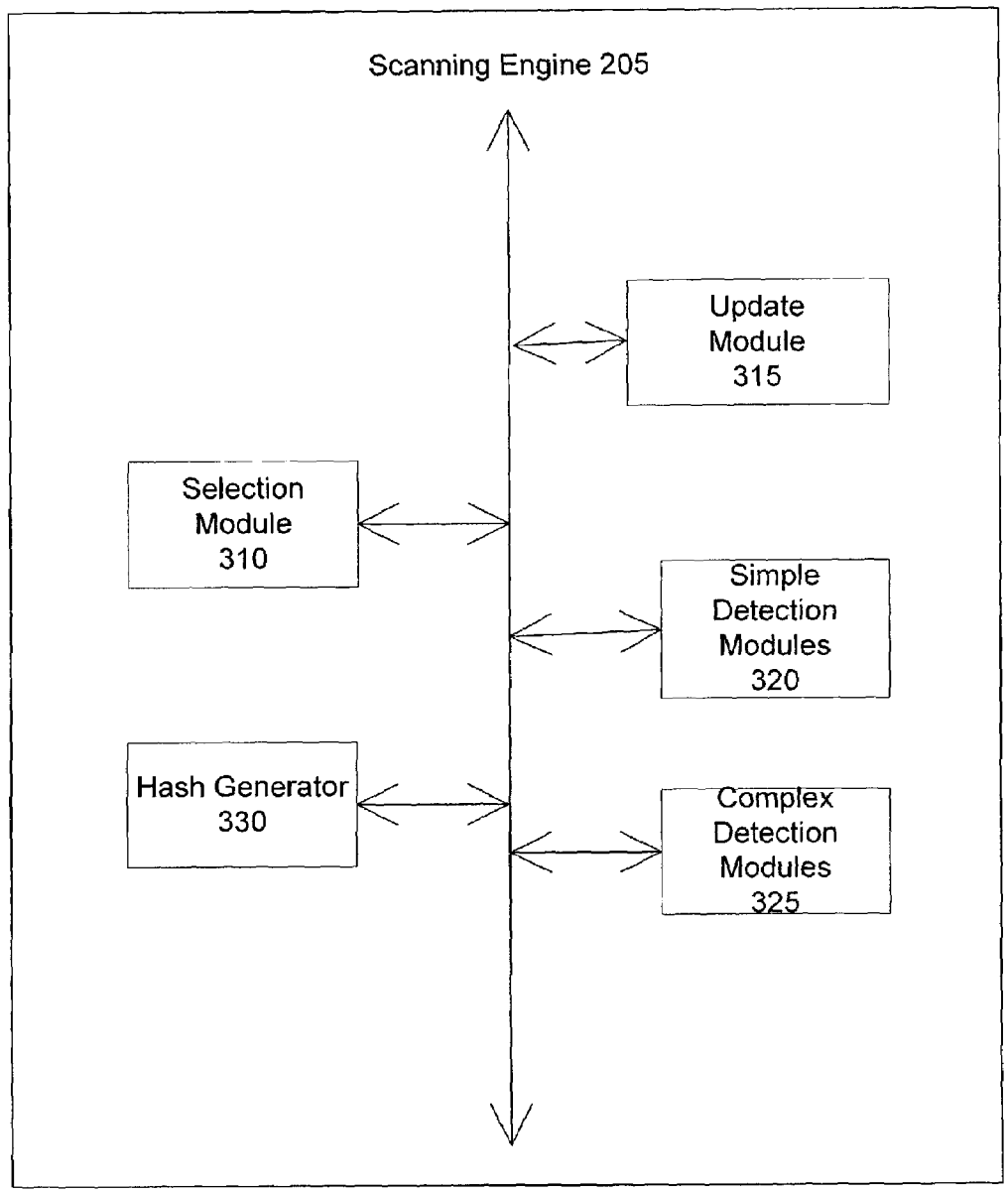
FIG. 3 is a block diagram illustrating a closer view of a scanning engine 205.

FIG. 3 is a block diagram illustrating a closer view of a scanning engine 205. The scanning engine 205 includes a selection module 310. The selection module 310 determines which tests to apply to the executable files 210. The selection module 310 is configured to evaluate a database entry 300 for a file 210 and determine which simple detection modules 320 and complex detection modules 325 to apply to the file 210.

A hash generator 330 is configured to generate a hash of an executable file 210. The generated hashes are compared with previously generated hashes to determine when a file 210 was last altered.

The scanning engine 205 includes a group of simple detection modules 320. These detection modules 320 typically check selected areas of a file 210 for distinct code sequences or other signature information. Alternately, they may check the file 210 for distinctive characteristics such as a particular size. Each detection module 320 is associated with a particular attacking agent. These detection modules 320 are typically applied in parallel.

The scanning engine 205 additionally includes a set of complex detection modules 325. These detection modules 325 are configured to perform more advanced tests on a file 210 to determine whether malicious code is present. Additionally, the scanning engine 205 stores information related to the attacking agent in association with the detection module 325 intended to detect the attacking agent.

The scanning engine 205 additionally includes an update module 315 that updates the inoculation database 230. The update module 315 periodically compares the hash stored in the inoculation database 230 to new hashes generated by the hash generator 330. If the hashes are different, the update module 315 stores the new hash in the inoculation database 230 and updates the date of the last change to the file 210 to the current date. Additionally, the update module 315 updates the scan date for a file 210 stored in the inoculation database 230 whenever a complex detection module 325 scans the file 210 for its associated attacking agent.

Figure 4:
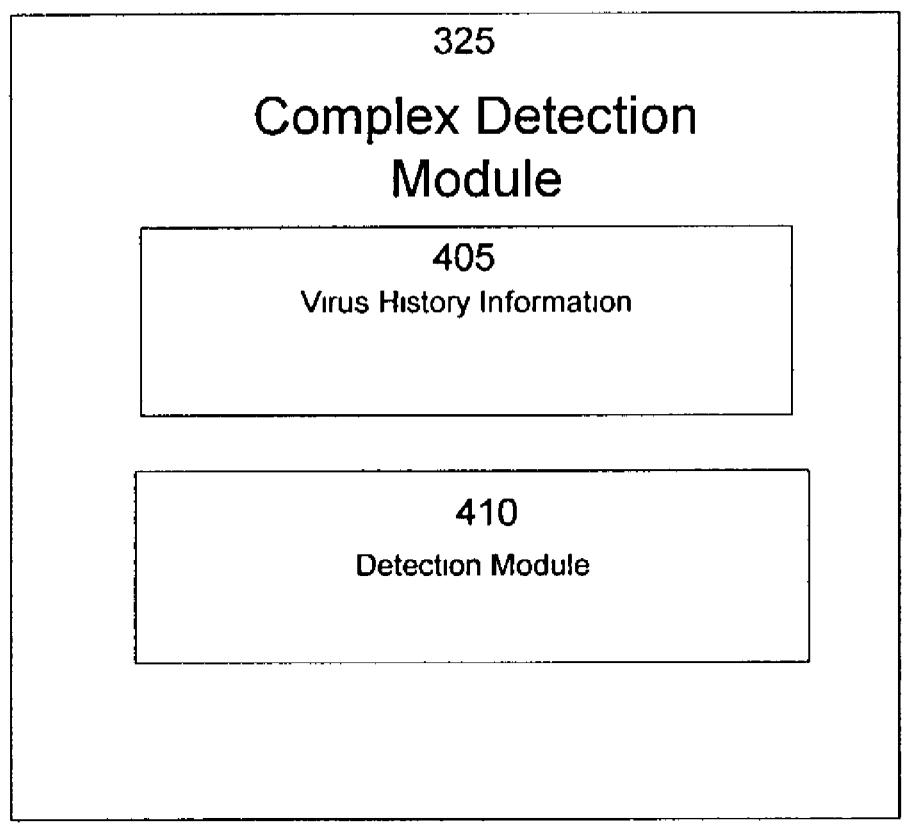
FIG. 4 is a block diagram illustrating a closer view of a complex detection module 325.

FIG. 4 is a block diagram illustrating a closer view of a complex detection module 325. Typically, each complex detection module 325 is associated with a particular attacking agent. The complex detection module 325 includes virus history information 405. This information indicates a creation date for the associated attacking agent as well as any other information that may be useful to preemptively determine whether a file 210 has been infected by the attacking agent. The creation date may be the actual date when the attacking agent was believed to be created or a date when the attacking agent was first publicly circulated.

The complex detection module 325 additionally includes detection modules 410 associated with particular attacking agents. These detection modules 410 perform various emulation methods to detect attacking agents that resist signature based detection methods. For example, a complex detection module is necessary to detect the presence of a polymorphic encrypted virus. A polymorphic encrypted virus ("polymorphic virus") includes a decryption routine and an encrypted viral body. To avoid standard detection techniques, polymorphic viruses use decryption routines that are functionally the same for all infected files 210, but have different sequences of instructions. Thus, the scanning engine 205 cannot detect a polymorphic virus by applying one of the simple detection modules 320. Instead, the scanning engine 205 applies a complex detection module 325, which entails loading the executable file 210 into a software-based CPU emulator acting as a simulated virtual computer. The file 210 is allowed to execute freely within this virtual computer. If the file 210 does in fact contain a polymorphic virus, the decryption routine is allowed to decrypt the viral body. The detection module 325 detects the virus by searching through the virtual memory of the virtual computer for a signature from the decrypted viral body. The complex detection modules 325 may also be configured to detect metamorphic viruses, that, while not necessarily encrypted, also vary the instructions stored in the viral body, or any other type of attacking agent that cannot be detected through simple signature based detection.

Typically, each complex detection module 325 is associated with a particular attacking agent and is equipped to detect its presence, though in alternate embodiments multiple detection modules 325 may be associated with a single attacking agent, or a single detection module 325 may be equipped to detect multiple attacking agents. Each complex detection module 325 includes a version number, which is updated whenever a new version of the detection module 325 is installed.

Figure 5:
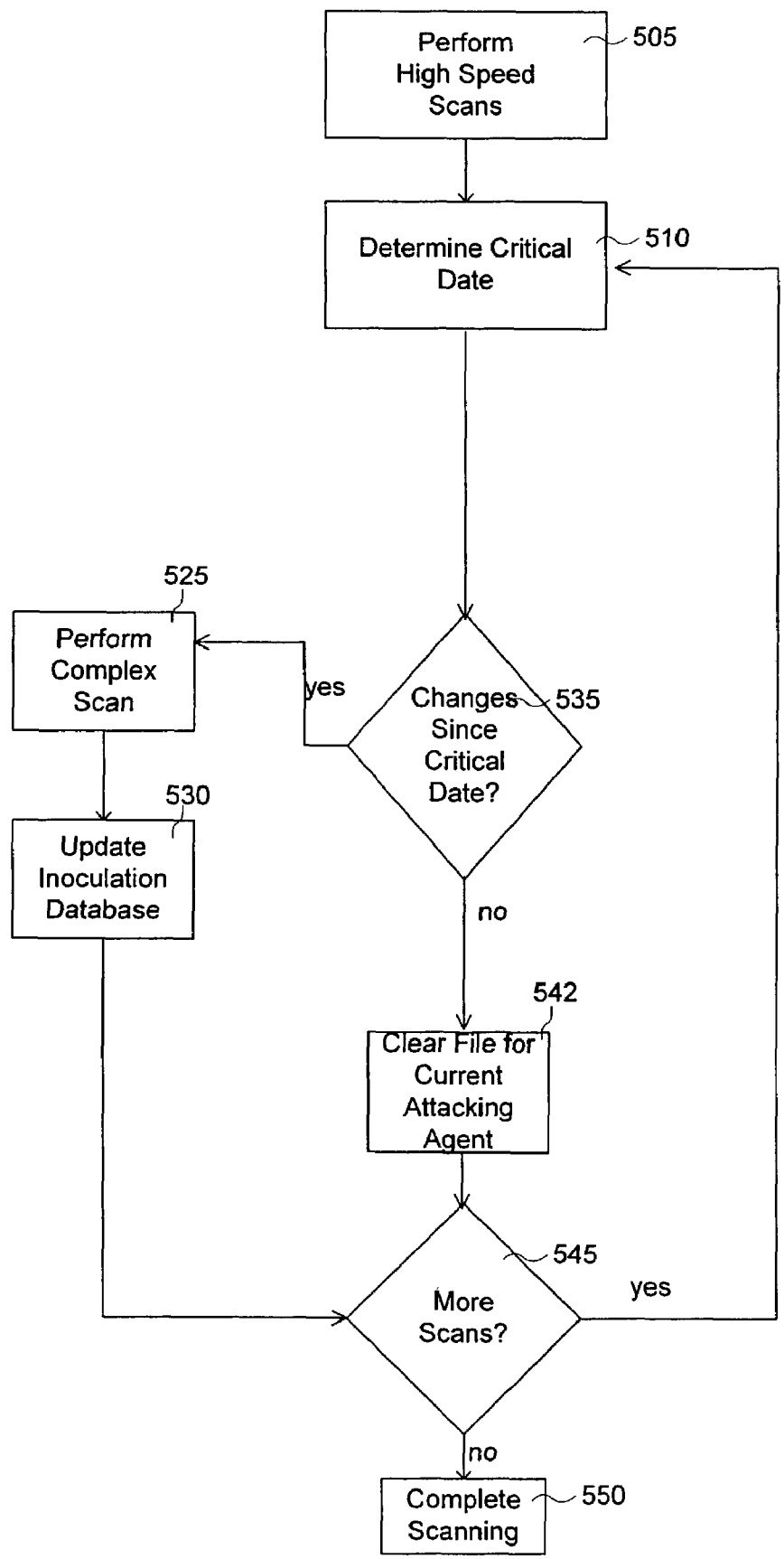
FIG. 5 is a flow chart illustrating a method for detecting malicious code in a file in accordance with one embodiment of the present invention.

FIG. 5 is a flow chart illustrating a method for detecting malicious code in a file 210. The process begins with the scanning engine 205 applying 505 the simple detection modules 320 to the file 210 to be scanned. Typically, this process is performed until all of the simple detection modules 320 have been applied to the file 210. The selection module 310 then begins to serially determine for each of the complex detection modules 325 whether the file 210 should be scanned. At step 510, the selection module 310 determines the critical date for the attacking agent. In one embodiment, the critical date is the creation date for the attacking agent as stored in the virus history information 405. Alternatively, the critical date might be the last time the file 210 was scanned with the particular complex detection module 325 in question. This can be determined by the selection module 310 checking the inoculation database 230 to determine the last time that the current complex detection module was applied to the file 210. Alternately, the critical date may be any other date when the file 210 was believed to be free of infection by the attacking agent.

The selection module 310 then determines 535 whether the file 210 has been changed since the critical date. The selection module 310 may check the change log 225 and determine when the last change to the file 210 occurred. Alternatively, the selection module 310 may check the inoculation database 230 to determine when the last change occurred. If the date when the file 210 last changed is not earlier than the critical date, then the selection module 310 directs the detection module 325 to scan 525 the file 210 for its associated attacking agent. If the date when the file 210 was last changed is later than the critical date the scanning engine 205 determines 542 that the file 210 has not been infected by the current attacking agent.

When the file 210 has been scanned with one of the complex detection modules 325, the update module 315 replaces 530 the scan date stored in the inoculation database 215 with the current date.

The selection module 310 then determines 545 whether the file 210 should be scanned for additional attacking agents. Preferably, the file 210 is checked by each detection module 325 for its associated attacking agent. If the file 210 needs to be scanned for additional attacking agents, the process is repeated from step 510 for each remaining detection module 325. If the file 210 does not need to be scanned for additional attacking agents, the scanning engine completes 550 the scanning process.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for determining if a computer file is infected, said method comprising:
   executing a high speed scan to determine if the file is infected by a simple attacking agent associated with a simple detection module;
   determining a creation date for a complex attacking agent associated with a complex detection module;
   determining a last change date of the computer file;
   comparing the last change date to the creation date for the complex attacking agent associated with the complex detection module;
   executing a complex scan to determine if the file is infected by the complex attacking agent responsive to the last change date being later than the creation date for the complex attacking agent; and
   determining that the file is not infected by the complex attacking agent responsive to the last change date being earlier than the creation date for the complex attacking agent.

2. The method of claim 1, further comprising modifying a database entry storing a last scan date of the file to indicate a current date.

3. The method of claim 1, wherein determining a last change date comprises:
   reading a change log, the change log indicating changes made to the file and dates associated with the changes; and
   determining that the last change date is the latest date associated with a change to the file in the change log.

4. The method of claim 1, wherein determining the last change date comprises reading a change indicator, wherein the change indicator is generated by steps including:
   generating a new hash of the file;
   comparing the new hash to a previously generated hash; and
   modifying the change indicator to list a current date when the new hash and the previously generated hash are different.

5. A system for determining if a computer file is infected, the system comprising:
   an inoculation database storing a plurality of entries, each entry associated with a file and containing a last change date for the file;
   a simple detection module in communication with the inoculation database and configured to execute a high speed scan to determine if the file is infected by a simple attacking agent;
   a complex detection module in communication with the inoculation database and configured to execute a complex scan to check the file for infection by a complex attacking agent, the complex detection module storing a creation date for the complex attacking agent; and
   a selection module in communication with the inoculation database and with the complex detection module, the selection module configured to compare the last change date to the creation date, direct the complex detection module to check the file for infection responsive to the last change date being later than the creation date for the complex attacking agent and determine that the file is not infected by the complex attacking agent responsive to the last change date being earlier than the creation date for the complex attacking agent.

6. The system of claim 5, further comprising an update module in communication with the complex detection module and with the inoculation database, the update module configured to change a last scan date of the file to a current date when the complex detection module checks the file for infection by the complex attacking agent.

7. The system of claim 6, further comprising:
a hash generator, in communication with the inoculation database and with the update module, and configured to generate a new hash of the file;
wherein:
the selection module is configured to compare the new hash with a previously generated hash; and
the update module is configured to replace the change date with a current date when the previously generated hash and the new hash are not identical.

8. A computer-readable storage medium containing computer code instructions for determining if a computer file infected, the computer code instructions when executed cause a processor to carry out the steps of:
executing a high speed scan to determine if the file is infected by a simple attacking agent associated with a simple detection module;
determining a creation date for a complex attacking agent associated with a complex detection module;
determining a last change date of the computer file;
comparing the last change date to the creation date for the complex attacking agent associated with the complex detection module;
executing a complex scan to determine if the file is infected by the complex attacking agent responsive to the last change date being later than the creation date for the attacking agent; and
determining that the file is not infected by the complex attacking agent responsive to the last change date being earlier than the creation date for the complex attacking agent.

9. The computer readable storage medium of claim 8, wherein the instructions for determining if the computer file is infected further comprise instructions for modifying a database entry storing a last scan date of the file to indicate a current date.

10. The computer readable storage medium of claim 8, wherein the instructions for determining if the computer file is infected further comprise instructions for:
generating a new hash of the file;
comparing the new hash to a previously generated hash; and
modifying an indicator of the last change date to list a current date when the new hash and the previously generated hash are different.

11. A method for determining if a file is infected, the method comprising:
executing a high speed scan to determine if the file is infected by a simple attacking agent associated with a simple detection module;
determining a creation date for a complex attacking agent associated with a complex detection module;
determining a last change date of the file;
determining a last scan date on which the file was scanned for the presence of the complex attacking agent;
comparing the last change date to the creation date for the complex attacking agent and to the last scan date on which the file was scanned for the presence of the complex attacking agent;
executing a complex scan to determine if the file is infected by the complex attacking agent responsive to the last change date being later than both of the creation date for the complex attacking agent and the last scan date on which the file was scanned for the presence of the complex attacking agent; and
determining that the file is not infected by the complex attacking agent responsive to the last change date being earlier than at least one of the creation date for the complex attacking agent and the last scan date on which the file was scanned for the presence of the complex attacking agent.

12. The method of claim 11, further comprising:
modifying a database entry storing the scan date to indicate a current date when the file is scanned for infection by the complex attacking agent.

13. The method of claim 11, wherein determining a last change date comprises:
reading a change log, the change log indicating changes made to the file and dates associated with the changes; and
determining that the last change date is the latest date associated with a change to the file in the change log.

14. The method of claim 11, wherein determining the last change date comprises reading a change indicator, wherein the change indicator is generated by steps including:
generating a new hash of the file;
comparing the new hash to a previously generated hash; and
modifying the change indicator to list a current date when the new hash and the previously generated hash are different.

15. The method of claim 1, wherein executing the high speed scan comprises executing a signature-based scan.

16. The method of claim 1, wherein the complex attacking agent is resistant to signature-based detection methods.

17. The method of claim 1, wherein the complex attacking agent has an encrypted viral body, wherein scanning the file for the complex attacking agent comprises:
loading the file in a virtual computer;
decrypting the viral body of the complex attacking agent using the virtual computer; and
scanning a virtual memory of the virtual computer for a signature from the decrypted viral body.

18. The method of claim 1, further comprising executing a second high speed scan in parallel to the high speed scan to determine if the file is infected by the a second simple attacking agent associated with a second simple detection module.

19. The computer readable storage medium of claim 8, further comprising instructions for executing a second high speed scan in parallel to the high speed scan to determine if the file is infected by a second simple attacking agent associated with a second simple detection module.

20. The method of claim 11, further comprising executing a second high speed scan in parallel to the high speed scan to determine if the file is infected by a second simple attacking agent associated with a second simple detection module.

* * * * *